(12) United States Patent
Fiero

(10) Patent No.: US 6,373,501 B1
(45) Date of Patent: Apr. 16, 2002

(54) PORTABLE DEVICE COMPRISING KEYPAD AND SCREEN

(76) Inventor: Richard A. Fiero, 63 Almenar Dr., Greenbrae, CA (US) 94904

( * ) Notice: Subject to any disclaimer, the term of this patent is extended or adjusted under 35 U.S.C. 154(b) by 0 days.

(21) Appl. No.: 09/525,564

(22) Filed: Mar. 15, 2000

(51) Int. Cl.$^7$ .............................. G06F 3/00; H04M 1/00
(52) U.S. Cl. ..................... 345/700; 345/835; 345/810; 345/764; 345/168; 379/433; 379/428
(58) Field of Search ................................. 345/352, 341, 345/123, 339, 156, 164, 168, 348, 326, 700, 810, 764, 835; 379/354, 355, 457, 170, 428, 433

(56) References Cited

U.S. PATENT DOCUMENTS

| | | |
|---|---|---|
| D298,240 S | 10/1988 | Chang |
| D298,620 S | 11/1988 | Ohta et al. |
| 4,875,234 A | 10/1989 | Tragatschnig |
| 4,969,647 A | 11/1990 | Mical et al. |
| D313,413 S | 1/1991 | Langton |
| D321,187 S | 10/1991 | Yang |
| D346,383 S | 4/1994 | Mehle-Hohnjec et al. |
| 5,369,788 A | 11/1994 | Nagai |
| D355,182 S | 2/1995 | Namba |
| D363,281 S | 10/1995 | Buhrmann |
| 5,665,000 A | 9/1997 | Burrell et al. |
| 5,703,932 A | 12/1997 | Oda |
| 5,758,267 A | 5/1998 | Pinder et al. |
| 5,848,152 A * | 12/1998 | Slipy et al. .................. 379/433 |
| D405,784 S | 2/1999 | Phillips et al. |
| 5,910,882 A | 6/1999 | Burrell |
| 5,937,360 A * | 8/1999 | Nishiyama et al. ......... 455/566 |
| 5,956,655 A * | 9/1999 | Suzuki et al. ............... 455/566 |
| 5,999,827 A * | 12/1999 | Sudo et al. .................. 455/564 |
| 6,038,313 A * | 3/2000 | Collins ........................ 379/433 |
| 6,073,033 A * | 6/2000 | Campo ........................ 455/566 |

FOREIGN PATENT DOCUMENTS

| | | |
|---|---|---|
| CA | 1054739 | 5/1979 |
| DE | 3123596 A1 | 1/1983 |
| DE | 4217540 A1 | 12/1992 |
| JP | 5-130188 | 5/1993 |
| WO | WO 97/26744 * | 7/1997 |

* cited by examiner

*Primary Examiner*—Raymond J. Bayerl
*Assistant Examiner*—Cuong T. Thai
(74) *Attorney, Agent, or Firm*—Christopher C. Sappenfield; Jonathan Alan Quine; Law Offices of Jonathan Alan Quine

(57) ABSTRACT

Portable electronic devices including housings in which input keypads are disposed above display screens and in which input keypads and/or display screens are optionally directly oriented for one-handed operation are provided. Devices including input keypads and/or display screens that are adjustably rotatable relative to device housings are also provided. Methods of manufacturing and using these portable electronic devices are additionally provided.

21 Claims, 2 Drawing Sheets

PORTABLE DEVICE COMPRISING KEYPAD AND SCREEN

COPYRIGHT NOTIFICATION

Pursuant to 37 C.F.R. 1.71(e), Applicants note that a portion of this disclosure contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

BACKGROUND OF THE INVENTION

Current portable electronic devices, such as cellular telephones, personal digital assistants, radios, and the like have been designed and manufactured in ways that limit a user's interface with the devices. These devices frequently include housings with output display screens positioned above input keypads during intended usage. Single-handed operation of a device with this configuration generally forces a user to hold the device with its center of gravity less than securely placed, if at all, within the hand. This lack of functional optimization makes one-handed operation difficult. These disadvantages are significant, because often a user has only a single hand available to engage the device due to a brief case, package, steering wheel, or other article occupying the other hand. For example, between establishing a communication link and communicating, the device is typically manipulated in the hand in order to switch between these tasks since the keys or other input mechanisms are not optimally disposed for operation by one hand.

The layout of existing portable electronic devices also contributes to repetitive stress injuries and other stress-related problems. Manipulation of many existing hand-held devices, especially during one-handed operation, produces awkward movements that cause stress on, e.g., the wrist, hand, and fingers. This is frequently due to balancing or otherwise holding the device at or near one end and stretching or constricting the thumb and/or fingers while attempting to engage the device. Aside from personal injury, this mode of holding and operating these devices makes it more likely that they will be dropped and damaged.

Hand-held devices which are optimized for communications and which include display screens below a set of input keys which provide for 10 digit or complete alphanumeric information input are not available. It would also be desirable to have portable electronic devices that are more directly configured for one-handed operation.

SUMMARY OF THE INVENTION

The present invention provides various portable electronic devices and methods related thereto. The devices generally include a housing that includes a front surface and a back surface. The front surface typically includes an upper region and a lower region. The devices also optionally include an input keypad in or proximal to the upper region. The input keypad typically includes input keys for inputting, e.g., each number in a ten digit system. Additionally, the devices optionally include a display screen in or proximal to the lower region. The display screen provides an output, e.g., for at least one or more numbers inputted from the input keypad or for stored or received data.

The components of the portable electronic devices of the present invention include various orientations relative to each other. For example, the display screen, the input keypad, or both, are optionally adjustably rotated relative to the housing, e.g., by a user. The housing, the display screen, and the input keypad each include at least one relative orientational axis in which the relative orientational axes are optionally substantially parallel or substantially non-parallel. Alternatively, the relative orientational axes of the display screen and the input keypad are substantially parallel, while an angle formed between the relative orientational axis of the display screen and the relative orientational axis of the housing is greater than zero. Each relative orientational axis optionally includes one or more distance, such as a length, a width, a base, a height, a non-diagonal length, or the like.

The components of the devices of the present invention also optionally include assorted shapes. For example, the front or the back surface of the housing is optionally formed in a shape that includes a regular n-sided polygon, an irregular n-sided polygon, a triangle, a square, a rectangle, a trapezoid, a circle, an oval, or the like. An external surface of the display screen and of the input keypad similarly each individually optionally include a shape independently selected from, e.g., a regular n-sided polygon, an irregular n-sided polygon, a triangle, a square, a rectangle, a trapezoid, a circle, an oval, or the like.

The display screen of the invention typically displays, e.g., textual information, graphical information, video information, or combinations thereof. The display screen also optionally includes, e.g., the input keypad on an upper region of the screen, in which the input keypad is a graphical screen keypad.

The input keypad and the input keys include various configurations. For example, the input keys of the input keypad optionally include at least one symbol disposed thereon. Furthermore, a portion of at least one of the input keys of the input keypad is optionally elevated or depressed relative to the front surface. The input keypad also optionally includes a graphical screen keypad or a virtual keypad. Alternatively, the input keypad also includes, e.g., at least 10 input keys. Optionally, the input keypad includes less than 10 input keys, in which at least some of the input keys are pressed more than once or in which multiple input keys are pressed simultaneously. The input keypad optionally also includes additional input keys, e.g., for inputting letters from an alphabet or commands represented by abstract insignia disposed on the additional input keys. The input keys of the present invention are also optionally utilized for partial or complete alphanumeric entry, e.g., of the 10 digits of a standard numeric system and for some or all of the letters of a given alphabet, such as the English, German, Japanese, Chinese, Spanish, or other alphabets.

The portable electronic device of the present invention optionally includes, e.g., a telephone, a telephone headset, a cellular phone, a cordless telephone, a cordless telephone headset, a calculator, a computer, an electronic organizer, a personal information manager, a personal digital assistant, a television, a global positioning device, a paging device, a radio, a CB radio, a short-wave radio, or the like. The devices also optionally include additional elements, such as a microphone, a speaker, an antenna, and the like.

In certain embodiments, a portion of the front surface is optionally movable relative to the back surface, or a portion of the back surface is optionally movable relative to the front surface. Additionally, at least one dimension of the device is optionally capable of at least one dimensional change, e.g., telescoping or folding a portion of the device in at least one dimension.

The present invention also includes methods of manufacturing a portable electronic device. The method typically includes forming a housing, a display screen, and input keys using one or more fabrication technique, in which the housing includes a front surface and a back surface, and in which the front surface includes an upper region and a lower region. The methods also include assembling the display screen and the input keypad in or on the front surface such that the input keys are disposed in or proximal to the upper region and the display screen is disposed in or proximal to the lower region. The input keys are optionally assembled in or on the front surface into an input keypad that includes, e.g., input keys for each number in a 10 digit system. The input keys are also optionally utilized for partial or complete entry of some or all of the letters of a given alphabet. The fabrication technique(s) selected to manufacture the device components optionally include, e.g., injection molding, compression molding, cast molding, die cutting, laser cutting, or the like. Additionally, the method includes assembling the display screen and the input keypad in or on the housing such that either or both is/are optionally adjustably rotated relative to the housing.

The present invention also includes a method of using a portable electronic device. The method includes holding the device in at least one hand of a user and positioning the device proximal to a head of the user. Thereafter, the user optionally engages the device by viewing the display screen, operating the input keypad with at least one finger on the hand, listening to sounds produced by a speaker disposed in the device, speaking into a microphone disposed in the device, or by performing a simultaneous or non-simultaneous combination of these steps.

DETAILED DISCUSSION OF THE INVENTION

Figure 1A:
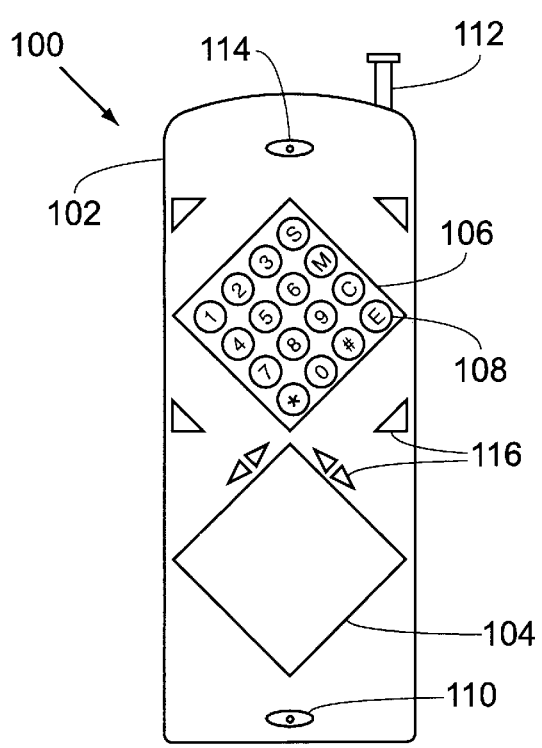
FIG. 1A shows a frontal view of a wireless communication device embodiment that includes an input keypad disposed above a display screen in which both the keypad and the screen are oriented for right-handed use.
Figure 1B:
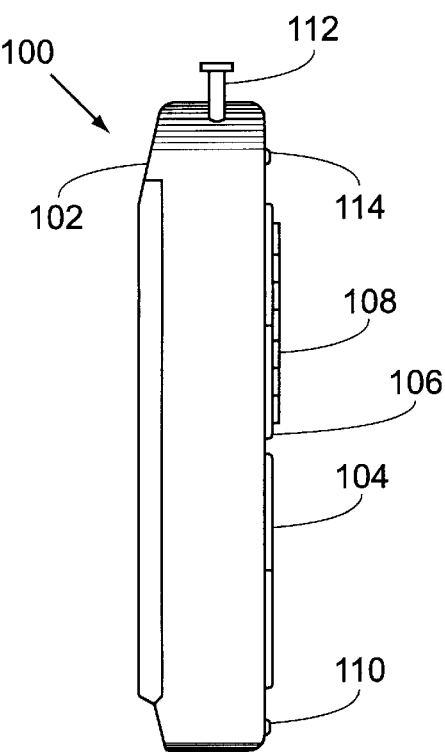
FIG. 1B shows the device of FIG. 1A from a side view.

The present invention provides improved portable or hand-held electronic devices, and methods related thereto, that include interfaces which enable users to operate the devices with greater effectiveness, with less physical stress, and with less risk of damage to the devices. The invention generally includes components, such as a keypad or other input mechanism that is positioned above an output or display screen in a front surface of a device housing. The keypad and/or the display screen is/are optionally oriented more directly for right- or left-handed usage or neutrally for usage by either hand. The keypad and/or the display screen is/are also optionally adjustably rotatable.

The component configurations of the invention provide various advantages over existing comparable devices especially during one-handed operation. For example, the input keys on an input keypad are more easily accessed and engaged by, e.g., a user's thumb, while the device is securely held, than with existing devices. Secure handling of the device during operation also decreases the probability that the device will be dropped or otherwise damaged. The input keypad orientation also provides for less stress on the hand and fingers of the user when engaging the keys. Furthermore, since the configuration provides for less distracting usage, it also leads to greater safety when simultaneously performing other tasks, e.g., operating a motor vehicle or the like.

In certain preferred embodiments, such as a wireless communication device (e.g., a cellular phone, etc.), the display screen is optionally viewable simultaneous with other device operations, e.g., speaking into a microphone, listening to a speaker, engaging an input key, or the like. FIGS. 1 and 2 show wireless communication device 100 of the present invention from various perspectives. As shown, the device typically includes housing 102 that includes a front surface and a back surface. The front surface includes an upper region and a lower region. In the embodiment depicted, the device also includes input keypad 106 in or proximal to the upper region. The input keypad typically includes input keys 108 for entering data. Alternative input components, such as graphical input interfaces are discussed below. Additional input is optionally received (and output sent) by, e.g., antenna 112. (FIG. 1). The devices also include display screen 104 (e.g., an optical display screen) in or proximal to the lower region for providing at least one form of output. Note, that although wireless communication device 100 illustrated in FIGS. 1A, 1B, 1C and 2 is configured primarily for right-handed use, it will be appreciated that the devices of the present invention can also be readily configured for predominantly left-handed use by, e.g., rotating input keypad 106 and/or display screen 104 clockwise about 90° from the orientations shown. As shown in FIG. 1D, wireless communication device 100 is also optionally configured neutrally for use by either hand.

In general, device dimensions (e.g., housing proportions, relative component size, or the like) are dependent on the size and flexibility of the human hand and fingers. The devices of the present invention are configured to be securely held and operated by one hand with relative ease. This typically includes the entire input keypad being accessible to the thumb of the operating hand.

Devices, such as wireless communication device 100, configured with input keys 108 disposed above display screen 104 provide many advantages over comparable existing devices. As mentioned, these advantages include allowing easier and more convenient display screen 104 viewing during other simultaneous device operations, e.g., listening to speaker 114, speaking into microphone 110, engaging input keys 108, using other operational keys 116, or the like. This mode of operation generally affords less interruption, e.g., when conversing and responding to voice-mail or similar prompts, while referencing information on display screen 104 at the same time. This configuration also reduces the likelihood that the device will be dropped, e.g., during operation, as the device is held more completely in the palm of the hand in order to engage input keys 108, relative to devices that have keypads disposed below displays. See e.g., FIG. 1C.

Aside from input keypad 106 being placed above display screen 104 in the portable electronic devices of the invention, these components also optionally include various orientations relative to each other or to housing 102. (FIGS. 1 and 2). Although not shown, in one embodiment of the invention display screen 104 and/or input keypad 106 are/is optionally capable of being adjustably rotated by a user relative to housing 102 and to various internal components (e.g., printed circuit boards, electronic components, etc.). Alternatively, the internal components or portions thereof in addition to display screen 104 and/or input keypad 106 are/is capable of adjustable rotation relative to housing 102. Optionally, adjustable rotation is accomplished by manual adjustment or by automated adjustment (e.g., actuating at least one internal drive motor operably connected to each component).

Housing 102, display screen 104, and input keypad 106 each include at least one relative orientational axis. (FIGS. 1 and 2). As used herein, the term "relative orientational axis" describes the orientation of device components, namely, the screen, the keypad, and the device housing, relative to one another; each of which optionally includes various shape permutations. As mentioned, the front or the back surface of housing 102 is optionally formed in a shape that includes a regular n-sided polygon, an irregular n-sided polygon, a triangle, a square, a rectangle, a trapezoid, a circle, an oval, or the like. Similarly, an external surface of display screen 104 and of input keypad 106 each individually typically include a shape independently selected from, e.g., a regular n-sided polygon, an irregular n-sided polygon, a triangle, a square, a rectangle, a trapezoid, a circle, an oval, or the like.

Figure 2:
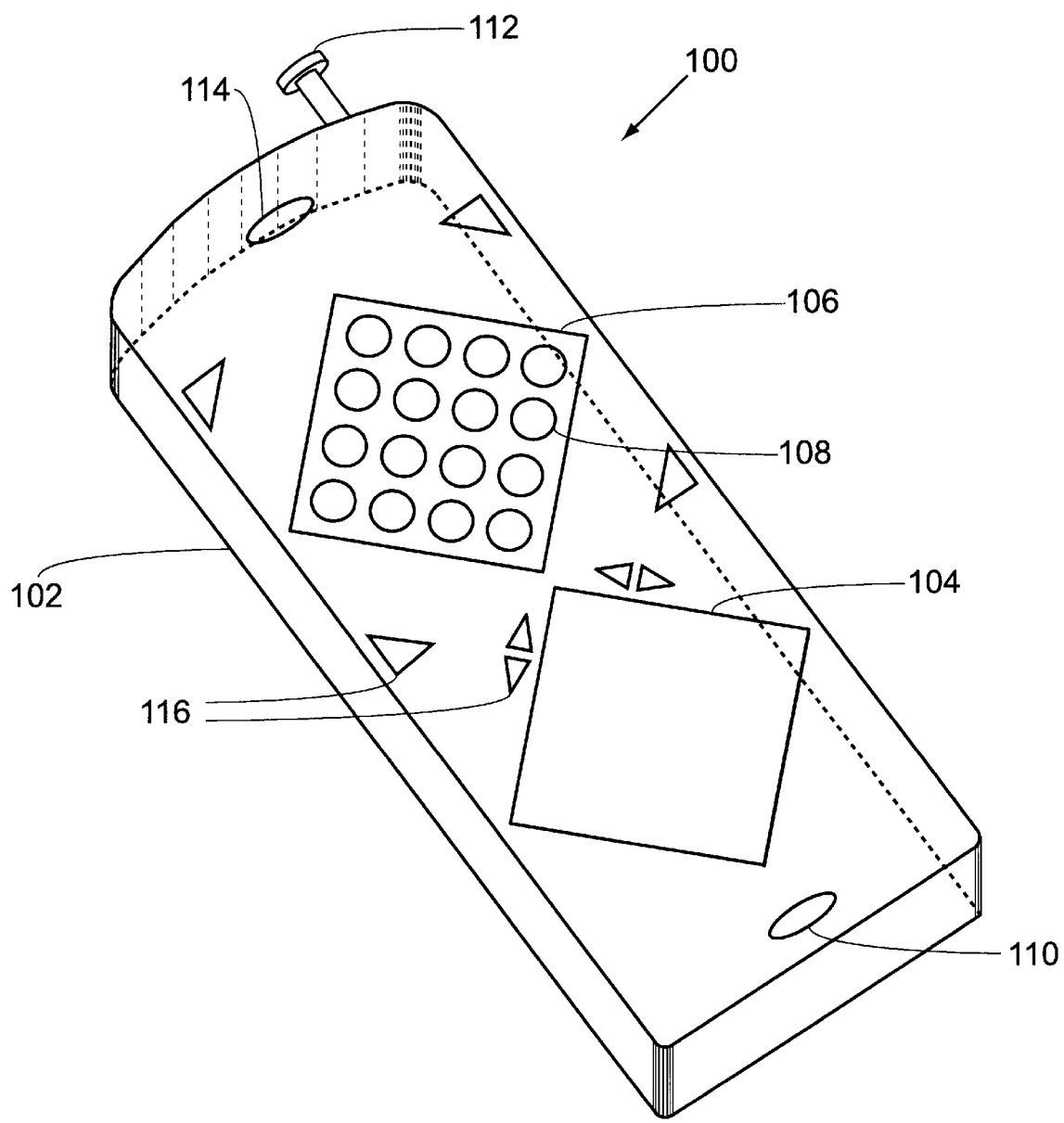
FIG. 2 provides a frontal three-dimensional view of the device of FIG. 1.

The meaning of relative orientational axis is further illustrated by referring to FIG. 1A. In a preferred embodiment depicted therein, the external surfaces of both input keypad 106 and display screen 104 are shaped as squares and the relative orientational axes of the two components are the lengths of the squares which, in this case, are substantially parallel. As shown, the front surface of housing 102 is shaped approximately as a rectangle. In turn, the relative orientational axis of housing 102 includes a length or a width of the rectangle, which in this case form an angle with the relative orientational axis (i.e., the length) of display screen 104 that is greater than zero (e.g., about 1°, 5°, 15°, 30°, 45°, 60°, or the like). Optionally, the relative orientational axes of display screen 104, input keypad 106, and/or housing 102 are substantially parallel or substantially nonparallel to one another. By analogy, the term "relative orientational axis" can be applied to other shape variations possible for display screen 104, input keypad 106, and housing 102.

Figure 1C:
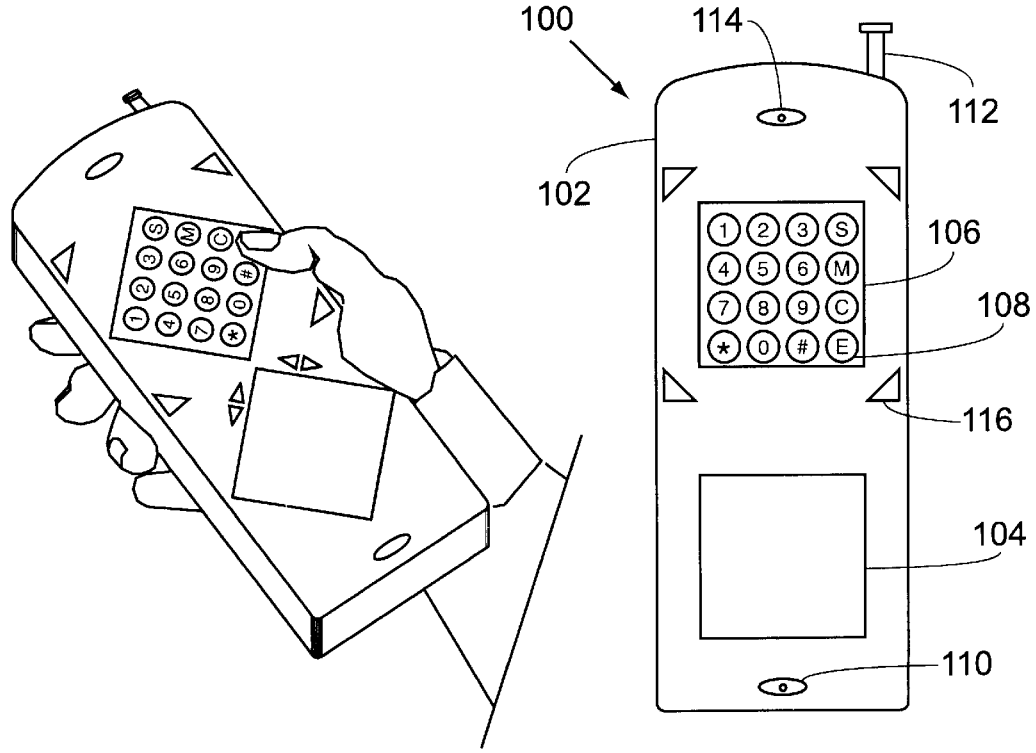
FIG. 1C depicts the device of FIG. 1A in the hand of a user.
Figure 1D:
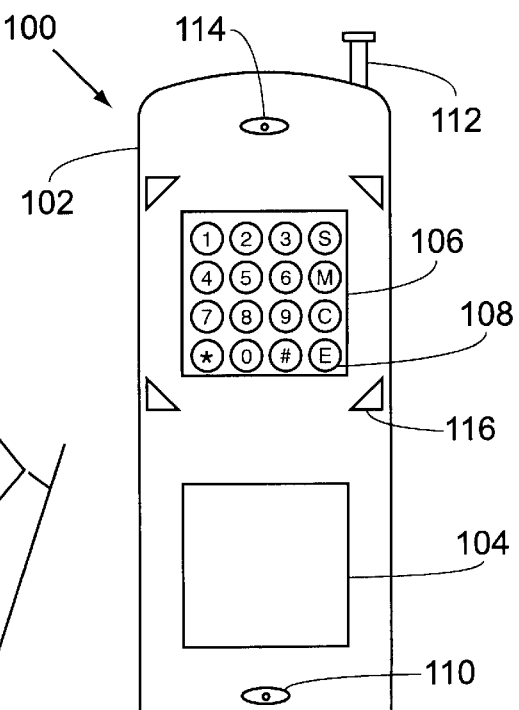
FIG. 1D shows a frontal view of a wireless communication device embodiment that includes an input keypad disposed above a display screen in which both the keypad and the screen are oriented neutrally for use by either hand.

As indicated in a preferred embodiment depicted in FIG. 1C, the angled orientation of the keypad and the display screen offer significant advantages relative to conventional devices. One advantage is that these devices are more suited for ergonomical usage. The thumb of a user can readily engage the input keys with less stressful movements. Similarly, the angled display screens of the devices of the present invention are more amenable to being viewed, e.g., at the same time a user is listening to output from a speaker.

The display screen of the invention is used to display various forms of output. The output optionally includes, e.g., textual information, video information, graphical information, or combinations thereof. The display screen also optionally includes a graphical screen keypad, e.g., on an upper region of the screen. Many display screens suitable for use in the present invention are known to those of skill including, e.g., cathode-ray tubes (CRTs), liquid-crystal displays (LCDs), digital displays, light-emitting diodes (LEDs), luminescent lamps, crystalline semiconductor diodes, video display terminals (VDTs), monitors, or the like.

A housing of a device also defines an interior space within which various electronic components are mounted on one or more printed circuit boards or other fictionally equivalent substrates (e.g., flexible plastic sheets or the like). The particular electronic components vary according to the application for which the device is designed. However, the components are generally operably connected to the input and output components. Power is optionally supplied to the various device components from an internal or an external source. An internal source typically includes a battery or other source (e.g., a miniature gas powered fuel cell, etc.). The devices also optionally include a connection port for external power sources. Suitable electronic components and powers sources appropriate for specific applications are well-known in the art.

The input keypad or keyboard and the input keys optionally include various arrangements or manifestations. For example, an input key typically includes one or more symbols disposed thereon, such as numbers, letters, abstract insignia, or the like, which represent information to be input into the device. Optionally, a portion of the input keys of the input keypad are elevated or depressed (i.e., angled, textured, slanted, rounded, etc.) relative to the front surface of the housing. The input keypad also optionally includes a graphical screen keypad, a virtual keypad, a touch-sensitive screen, or other graphical user interface (GUI) that enables a user to input information through the use of symbols, pointing devices, visual metaphors, handwritten character recognition, or the like.

Alternately, the input keypad includes 10 or more input keys (e.g., one key for each number in a 10 digit system, or more keys for additional command or information input), or less than 10 input keys in which at least some of the input keys are engaged in multiple ways to input different information. For example, data or other information is optionally entered by simultaneously engaging multiple keys (e.g., 2, 3, 4 or more). Furthermore, various combinations of key engagements are also optionally included to input alphanumeric or other information. Multifunctional keys are also alternatively included in input keypads that include 10 or more keys. Other keys (e.g., minimal, toggle, roller, etc.), switches (e.g., on/off switches, display screen lighting switches, etc.), dials, or the like are also typically disposed on a front, a side or other surface of a device for scrolling, pointing, adjusting (e.g., volume, tone, picture or screen quality, etc.), transmitting, sending, receiving, or the like. The devices of the present invention also optionally incorporate digital signal processors (DSPs) for the recognition and interpretation of speech input. Input keypads suitable for use in the present invention are generally well-known.

Aside from keys for entering numerical information, additional input keys are also optionally included for partial or complete alphanumeric entry, e.g., of the 10 digits of a standard numeric system and for some or all of the letters of a given alphabet, such as the English, German, Japanese, Chinese, Spanish, or other alphabets. As mentioned above, input keys are also optionally included for entering commands represented by abstract insignia disposed on the input keys. Many different arrangements or configurations of input keypads and input keys appropriate for the present invention are possible.

As mentioned, a portion of the front surface is optionally movable relative to the back surface, or a portion of the back surface is movable relative to the front surface. In these embodiments, keypads, display screens, and/or other components are optionally included in the movable portions. Additionally, at least one dimension of the device is optionally capable of at least one dimensional change, e.g., telescoping or folding a portion of the device in at least one dimension for more convenient device storage.

There are many different devices to which the component orientations of the present invention can be applied. Some of these devices include, e.g., a telephone, a telephone headset, a cellular phone (a particularly relevant and preferred embodiment), a cordless telephone, a cordless telephone headset, a calculator, a computer (e.g., a palm top computer, etc.), an electronic organizer, a personal information manager (e.g., a personal digital assistant, etc.), a television, a global positioning device, a paging device, a radio, a CB radio, a short-wave radio, or the like.

The invention also includes methods of manufacturing portable electronic devices with the component configurations described above. The methods optionally include forming a housing, a display screen, and input keys using one or more fabrication technique, in which the housing includes a front surface and a back surface, and in which the front surface includes an upper region and a lower region. The methods further include assembling the display screen and the input keypad in or on the front surface such that the input keys are disposed in or proximal to the upper region and the display screen is disposed in or proximal to the lower region. The input keys are typically assembled in or on the front surface into an input keypad that includes, e.g., input keys for each number in a 10 digit system, some or all letters of various alphabets, or other arrangements as described above. The fabrication technique(s) selected to manufacture the device components are generally well-known and include, e.g., injection molding, compression molding, cast molding, or the like. Components, such as housings are alternatively cut from substantially planar materials (e.g., plastic sheets, metal sheets, etc.) and folded or otherwise formed in the desired shape utilizing various well-known fabrication techniques including, e.g., die cutting, laser cutting, or the like. The methods also optionally include assembling the display screen and the input keypad in or on the housing such that either or both adjustably rotate relative to the housing.

The portable electronic devices of the present invention are typically operated by one hand. The thumb of the operating hand generally extends across a portion of the front surface of the device while the heel of the palm and the fingers clamp the device in the user's hand. The thumb is generally capable of readily engaging the input keypad even while the device is positioned proximal to a head of the user. The user typically engages the device by viewing the display screen, operating the input keypad with at least one finger on the hand (e.g., the thumb), listening to one or more sound produced by a speaker disposed in the device, speaking into a microphone disposed in the device, or by performing a simultaneous or non-simultaneous combination of these steps.

While the foregoing invention has been described in some detail for purposes of clarity and understanding, it will be clear to one skilled in the art from a reading of this disclosure that various changes in form and detail can be made without departing from the true scope of the invention. For example, all the techniques and apparatus described above may be used in various combinations. All publications and patent documents cited in this application are incorporated by reference in their entirety for all purposes to the same extent as if each individual publication or patent document were individually so denoted.

What is claimed is:

1. A portable electronic device, comprising:
    a housing comprising a front surface and a back surface, the front surface comprising an upper region and a lower region;
    an input keypad in or proximal to the upper region, the input keypad comprising input keys for inputting each number in a ten digit system; and,
    a display screen in or proximal to the lower region, the display screen providing an output for at least one or more numbers inputted from the input keypad or for stored or received data.

2. The portable electronic device of claim 1, wherein the display screen, the input keypad, or both, can be adjustably rotated relative to the housing.

3. The portable electronic device of claim 1, wherein the housing, the display screen, and the input keypad each comprise at least one relative orientational axis, wherein the relative orientational axes are substantially parallel.

4. The portable electronic device of claim 1, wherein the housing, the display screen, and the input keypad each comprise at least one relative orientational axis, wherein the relative orientational axes are substantially non-parallel.

5. The portable electronic device of claim 1, wherein the housing, the display screen, and the input keypad each comprise at least one relative orientational axis, wherein the relative orientational axes of the display screen and the input keypad are substantially parallel, and wherein an angle formed between the relative orientational axis of the display screen and the relative orientational axis of the housing is greater than zero.

6. The portable electronic device of claim 1, wherein the housing, the display screen, and the input keypad each comprise at least one relative orientational axis, wherein each relative orientational axis comprises one or more distance selected from the group consisting of: a length, a width, a base, a height, and a non-diagonal length.

7. The portable electronic device of claim 1, wherein the front or the back surface of the housing forms at least one shape selected from the group consisting of: a regular n-sided polygon, an irregular n-sided polygon, a triangle, a square, a rectangle, a trapezoid, a circle, and an oval.

8. The portable electronic device of claim 1, wherein an external surface of the display screen and of the input keypad individually comprise at least one shape independently selected from the group consisting of: a regular n-sided polygon, an irregular n-sided polygon, a triangle, a square, a rectangle, a trapezoid, a circle, and an oval.

9. The portable electronic device of claim 1, wherein the display screen displays textual information, graphical information, or video information, or combinations thereof, or,
    wherein the display screen comprises the input keypad on an upper region thereof, wherein the input keypad is a graphical screen keypad.

10. The portable electronic device of claim 1, wherein one or more of the input keys of the input keypad comprises at least one symbol disposed thereon; or,
    wherein the input keypad is a graphical screen keypad or a virtual keypad; or,
    wherein the input keypad comprises at least 10 input keys; or,
    wherein the input keypad comprises less than 10 input keys, wherein at least some of the input keys are pressed more than once or wherein multiple input keys are pressed simultaneously.

11. The portable electronic device of claim 1, the input keypad further comprising additional input keys for inputting letters from an alphabet or commands represented by abstract insignia disposed on the additional input keys.

12. The portable electronic device of claim 1, wherein at least a portion of at least one of the input keys of the input keypad is elevated or depressed relative to the front surface.

13. The portable electronic device of claim 1, wherein the device comprises one or more of: a telephone, a telephone headset, a cellular phone, a cordless telephone, a cordless telephone headset, a calculator, a computer, an electronic organizer, a personal information manager, a personal digital assistant, a television, a global positioning device, a paging device, a radio, a CB radio, or a short-wave radio.

14. The portable electronic device of claim 1, wherein the device comprises additional elements comprising: a microphone, a speaker, or an antenna.

15. The portable electronic device of claim 1, wherein a portion of the front surface is movable relative to the back surface; or, wherein a portion of the back surface is movable relative to the front surface.

16. The portable electronic device of claim 1, wherein at least one dimension of the device is capable of at least one dimensional change.

17. The portable electronic device of claim 16, wherein the at least one dimensional change comprises telescoping or folding a portion of the device in at least one dimension.

18. A method of manufacturing a portable electronic device, the method comprising:

forming a housing, a display screen, and input keys using one or more fabrication technique, wherein the housing comprises a front surface and a back surface, and wherein the front surface comprises an upper region and a lower region; and, assembling the display screen and the input keypad in or on the front surface such that the input keys are disposed in or proximal to the upper region and the display screen is disposed in or proximal to the lower region, wherein the input keys are assembled in or on the front surface into an input keypad comprising input keys for each number in a 10 digit system.

19. The method of claim 18, wherein the one or more fabrication technique comprises one or more of: injection molding, compression molding, cast molding, die cutting, or laser cutting.

20. The method of claim 18, comprising assembling the display screen and the input keypad in or on the housing such that either or both can be adjustably rotated relative to the housing.

21. A method of using a portable electronic device, the method comprising:

holding the device in at least one hand of a user, wherein the device comprises:

a housing comprising a front surface and a back surface, the front surface comprising an upper region and a lower region;

an input keypad in or proximal to the upper region, the input keypad comprising input keys for inputting each number in a ten digit system; and a display screen in or proximal to the lower region, the display screen providing an output for at least one or more numbers inputted from the input keypad or for stored or received data; and, positioning the device proximal to a head of the user, wherein the user engages the device by viewing the display screen, operating the input keypad with at least one finger on the at least one hand, listening to sounds produced by at least one speaker disposed in the device, speaking into at least one microphone disposed in the device, or by performing a simultaneous or non-simultaneous combination thereof.

* * * * *

(12) EX PARTE REEXAMINATION CERTIFICATE (5335th)
United States Patent
Fiero

(10) Number: US 6,373,501 C1
(45) Certificate Issued: Apr. 11, 2006

(54) PORTABLE DEVICE COMPRISING KEYPAD AND SCREEN

(75) Inventor: Richard A. Fiero, 63 Almenar Dr., Greenbrae, CA (US) 94904

(73) Assignee: Richard A. Fiero, Greenbrae, CA (US)

Reexamination Request:
No. 90/006,936, Feb. 13, 2004

Reexamination Certificate for:
Patent No.: 6,373,501
Issued: Apr. 16, 2002
Appl. No.: 09/525,564
Filed: Mar. 15, 2000

(51) Int. Cl.
*G06F 3/00* (2006.01)

(52) U.S. Cl. ............................... 715/700; 455/575.4
(58) Field of Classification Search ................ 715/700, 715/810, 835, 764; 455/566, 466, 575.4
See application file for complete search history.

(56) References Cited

U.S. PATENT DOCUMENTS

| | | | |
|---|---|---|---|
| 5,369,788 A | * | 11/1994 | Nagai ........................ 455/575.4 |
| 5,491,507 A | * | 2/1996 | Umezawa et al. ........ 348/14.02 |
| 5,661,632 A | | 8/1997 | Register |
| 5,949,408 A | | 9/1999 | Kang et al. |
| 6,073,033 A | * | 6/2000 | Campo ........................ 455/566 |
| 6,208,874 B1 | * | 3/2001 | Rudisill et al. ........... 455/575.4 |

FOREIGN PATENT DOCUMENTS

EP 0 802 658 A2 10/1997

* cited by examiner

*Primary Examiner*—Cao (Kevin) Nguyen

(57) ABSTRACT

Portable electronic devices including housings in which input keypads are disposed above display screens and in which input keypads and/or display screens are optionally directly oriented for one-handed operation are provided. Devices including input keypads and/or display screens that are adjustably rotatable relative to device housings are also provided. Methods of manufacturing and using these portable electronic devices are additionally provided.

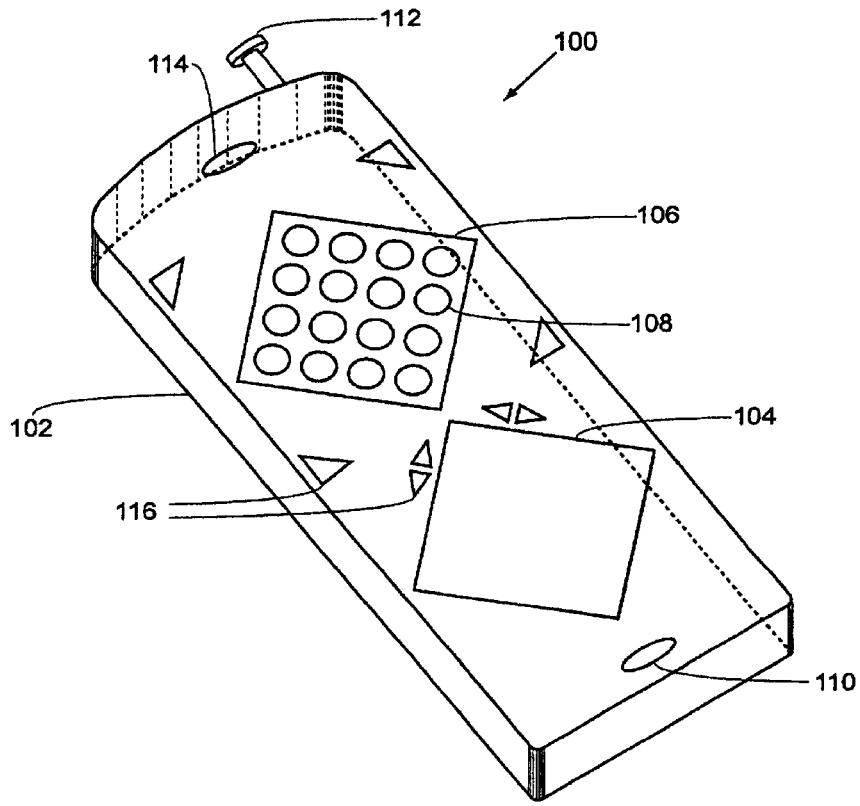

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 18 and 21 are determined to be patentable as amended.

Claims 2–17, 19 and 20, dependent on an amended claim, are determined to be patentable.

1. A portable electronic device, comprising:
   a housing comprising a front surface and a back surface, the front surface comprising an upper region and a lower region, *which upper and lower regions are non-foldable relative to one another*;
   an input keypad in or proximal to the upper region, the input keypad comprising input keys for inputting each number in a ten digit system; and,
   a display screen in or proximal to the lower region, the display screen providing an output for at least one or more numbers inputted from the input keypad or for stored or received data.

18. A method of manufacturing a portable electronic device, the method comprising:
    forming a housing, a display screen, and input keys using one or more fabrication technique, wherein the housing comprises a front surface and a back surface, and wherein the front surface comprises an upper region and a lower region, *which upper and lower regions are non-foldable relative to one another*; and,
    assembling the display screen and the input keypad in or on the front surface such that the input keys are disposed in or proximal to the upper region and the display screen is disposed in or proximal to the lower region, wherein the input keys are assembled in or on the front surface into an input keypad comprising input keys for each number in a 10 digit system.

21. A method of using a portable electronic device, the method comprising:
    holding the device in at least one hand of a user, wherein the device comprises:
    a housing comprising a front surface and a back surface, the front surface comprising an upper region and a lower region, *which upper and lower regions are non-foldable relative to one another*;
    an input keypad in or proximal to the upper region, the input keypad comprising input keys for inputting each number in a ten digit system; and
    a display screen in or proximal to the lower region, the display screen providing an output for at least one or more numbers inputted from the input keypad or for stored or received data; and,
    positioning the device proximal to a head of the user, wherein the user engages the device by viewing the display screen, operating the input keypad with at least one finger on the at least one hand, listening to sounds produced by at least one speaker disposed in the device, speaking into at least one microphone disposed in the device, or by performing a simultaneous or non-simultaneous combination thereof.

\* \* \* \* \*